United States Patent
Blevins

[15] 3,681,900
[45] Aug. 8, 1972

[54] HYBRID SEED DETASSELER

[72] Inventor: Raymond H. Blevins, Lexington, Ill.

[73] Assignee: Carter Blevins Detasslers, Inc., Danville, Ill.

[22] Filed: Dec. 3, 1970

[21] Appl. No.: 94,798

[52] U.S. Cl. .........................56/63, 171/58, 239/171
[51] Int. Cl. .............................................A01d 45/02
[58] Field of Search ............56/56, 63, 11.9; 239/171; 169/2 A; 244/136; 171/58; 144/34 R, 34 A, 34 F, 309; 143/68 H

[56] References Cited

UNITED STATES PATENTS

| | | |
|---|---|---|
| 2,707,008 | 4/1955 | Bannister....................239/171 |
| 2,397,249 | 3/1946 | Dostal..........................171/58 |
| 879,666 | 2/1908 | Neild.............................56/56 |
| 1,704,083 | 3/1929 | Gregory..........................56/56 |
| 2,953,209 | 9/1960 | DeMarco......................171/58 |

Primary Examiner—Antonio F. Guida
Attorney—Burns, Doane, Swecker & Mathis

[57] ABSTRACT

A method and apparatus for removing the tassel portions of stalks standing in the field from above the standing grain. An aerial vehicle, such as a helicopter, carries means for operating below the vehicle, receiving the tassel portions of the stalks and causing an upward pull thereon to separate the tassel portions at the first or second joint. The detasseling means includes a pair of rolls to receive the tassel portions of the stalks therebetween and operate in opposed directions to cause upward pull on the stalks, thereby to separate the tassel portions from the standing stalks. Conveyor means operates lengthwise of the rolls to move the stalks therebetween along the length of the rolls. Feeding means is provided at the forward ends of the rolls and a cutter at the back ends of the rolls to remove any of the tassel portions not separated by the rolls.

15 Claims, 8 Drawing Figures

PATENTED AUG 8 1972

INVENTOR.
RAYMOND H. BLEVINS,
BY
Burns, Doane, Swecker & Mathis
ATTORNEYS

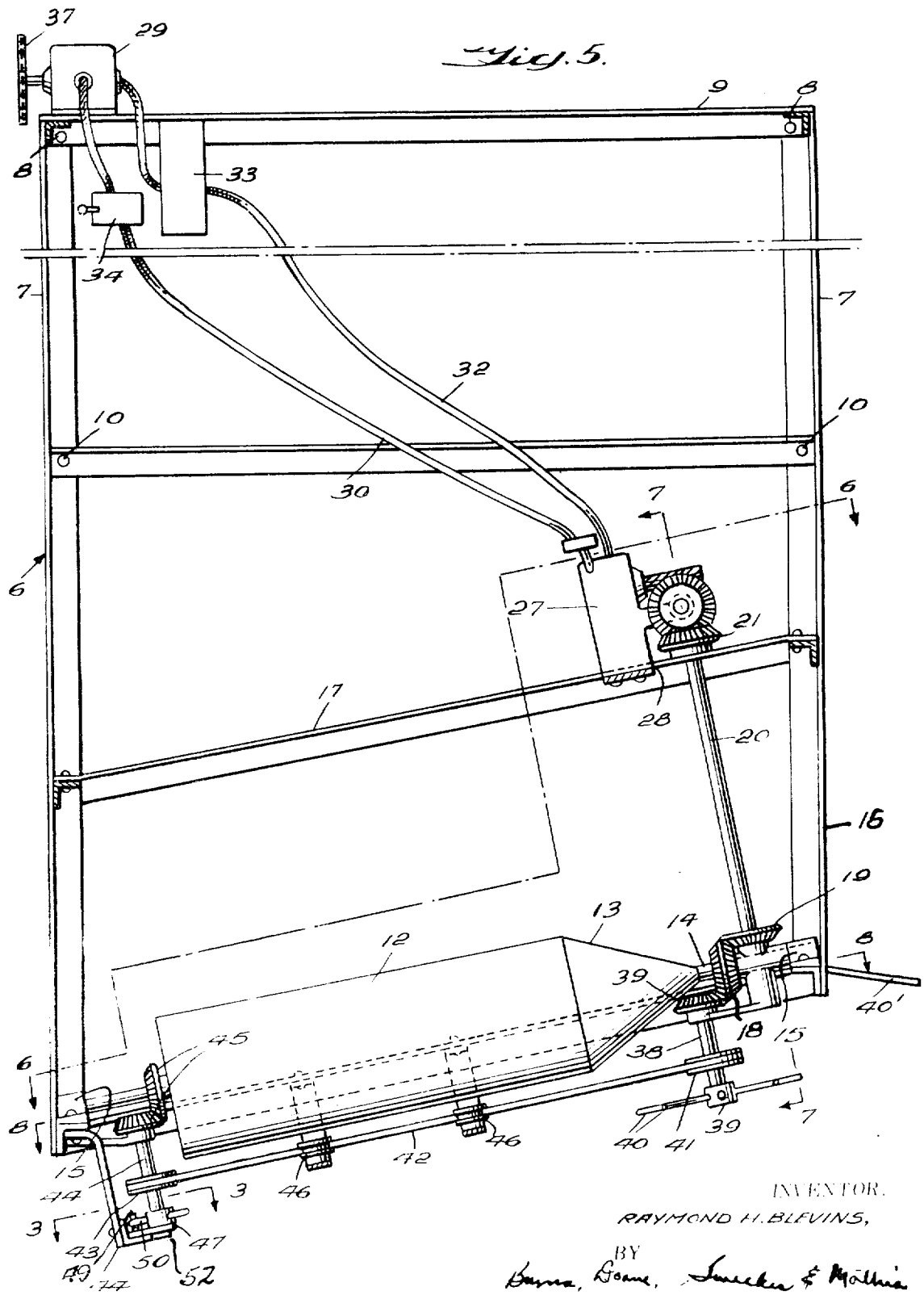

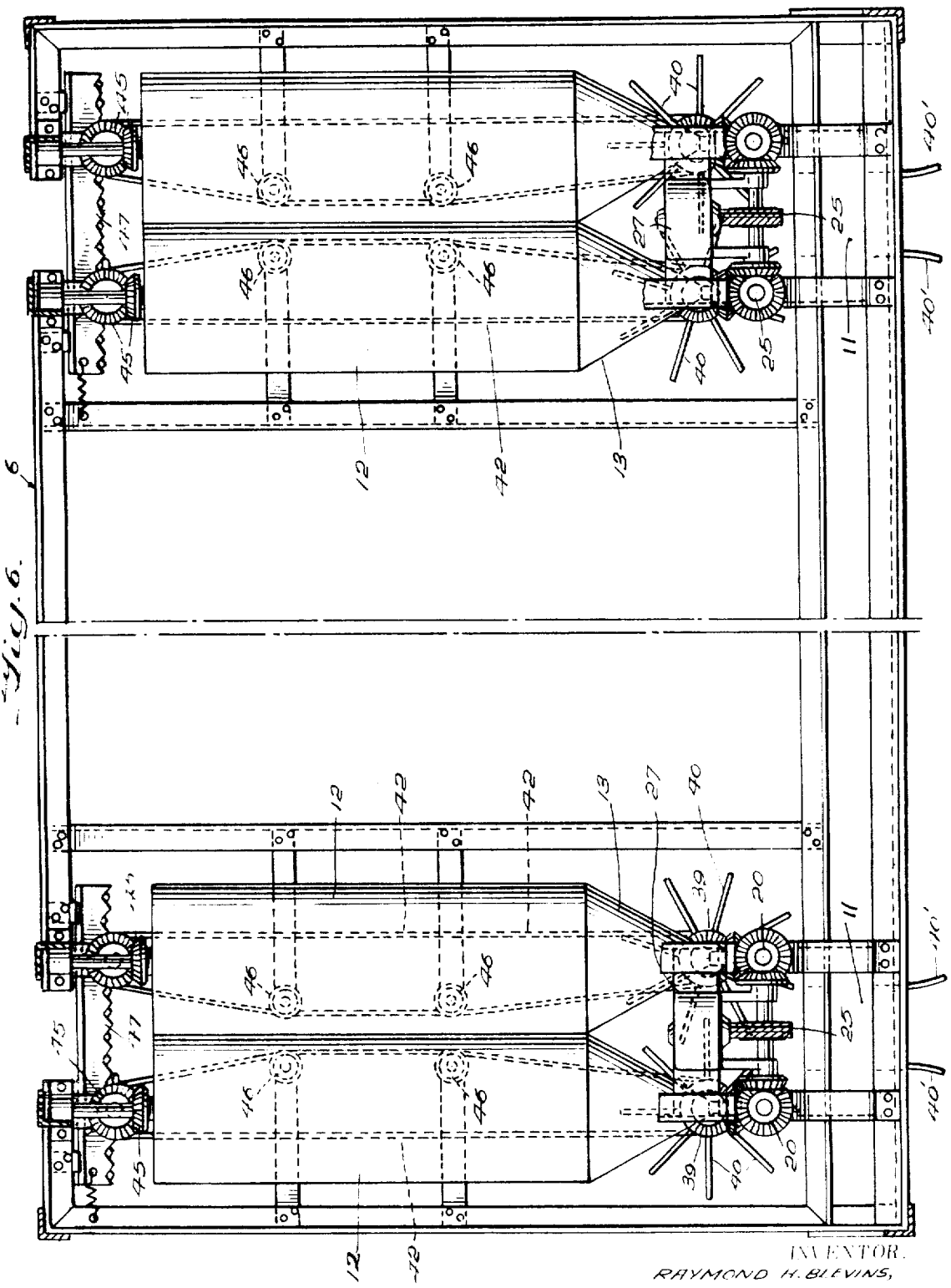

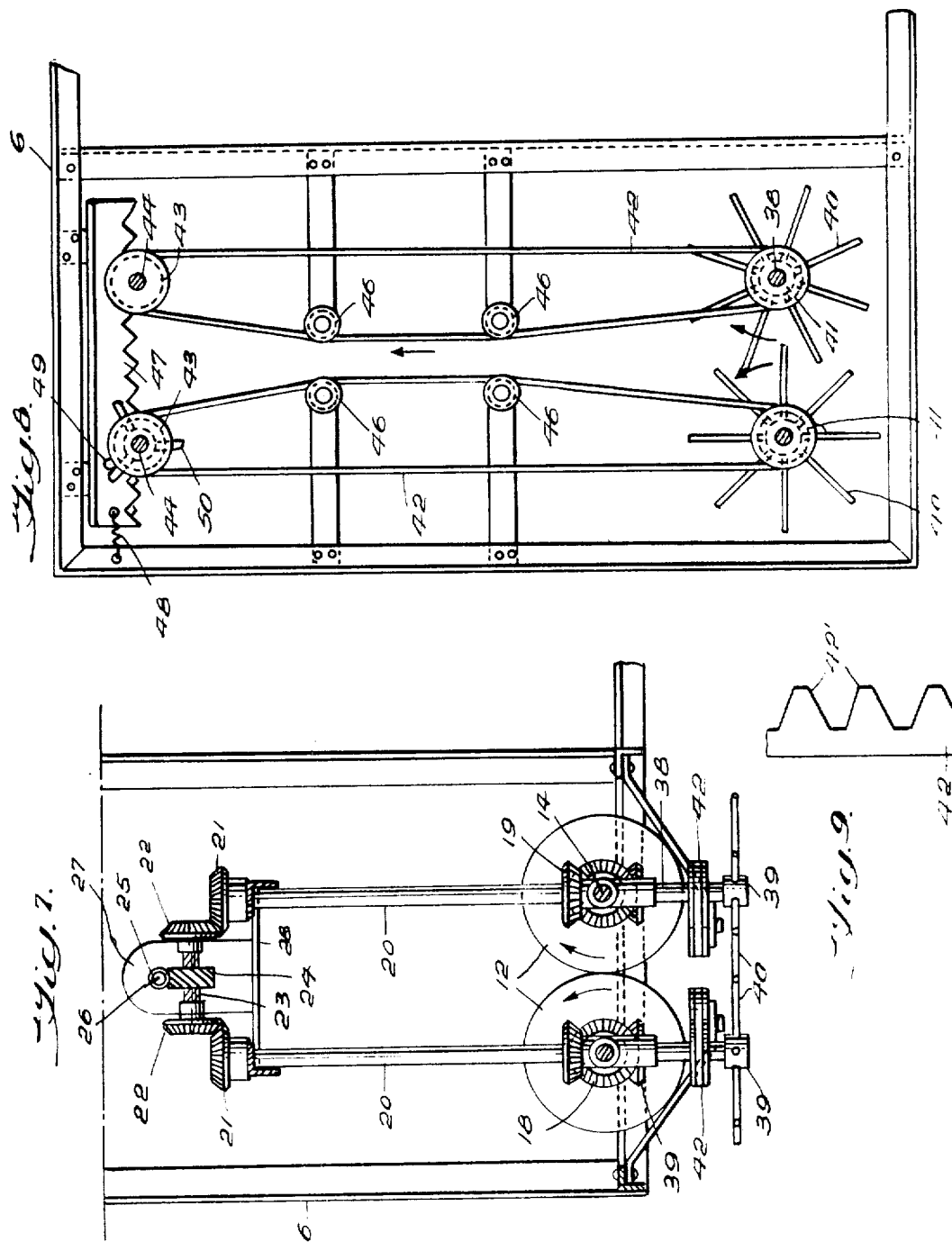

3,681,900

HYBRID SEED DETASSELER

SUMMARY OF THE INVENTION

In the planting of grain for hybrid seed, it has been customary, especially with corn, to plant this in rows. When the corn reaches the tassel stage, the tassels from the female plants are removed leaving the tassels on the male plants for pollination of the female plants. It is customary at the present time to plant four rows for female plants, alternating with two rows for male plants.

All of the tassel portions of the female plants must be removed for effective production of seed of desired hybrid quality. This pulling of the tassel portions has been a hand operation because there has not been available heretofore any effective means for removing the tassel portions. Hand operation requires a great many laborers in the course of a short period of time which is expensive and not enough labor is available for this purpose.

Attempts have been made to use power operated machinery moving through the fields on the ground, but these have not been successful. Such attempts have sought to cut off the tassel portions of the stalks from the female plants, but such cutting has not been accurate. The movement of machinery through the fields of standing and growing corn makes it impossible to use rows that are spaced more closely together and which also destroys many of the stalks.

One object of this invention is to overcome the objections to hand operations practice heretofore, as well as the attempts made to utilize machines for this purpose and to provide an effective method and apparatus for removing the tassel portions of stalks of grain in order that the desired seed may be produced.

Another object of the invention is to provide for the use of an aerial vehicle, such as a helicopter, that will be effective to remove the tassel portions of stalks of grain standing in the field by operating over the field without disturbing the standing stalks otherwise than to remove the tassel portions therefrom.

Still another object of the invention is to provide for the engagement of the tassel portions of stalks in a row or rows as the device is moved therealong to cause an upward pull on the tassel portions and thereby separating these from the standing stalks at the first or second joint.

These objects may be accomplished by suspending a supporting frame beneath an aerial vehicle, such as a helicopter. The suspending means may include parallel motion links which will support the supporting frame with the operating means in position above or below the running gear of the vehicle.

The seed detasseling means includes a pair of rolls mounted in oblique position on the supporting frame so that as the vehicle moves along a row, the rolls receive the tassel portions of the plants or stalks therebetween and cause an upward pull on the tassel portions to separate these from the stalks. Means is provided for feeding the stalks along the length of the rolls and cutter means may be used to separate the tassel portions from any stalks where the separation was not accomplished by the rolls.

BRIEF DESCRIPTION OF THE DRAWINGS

One embodiment of the invention is illustrated in the accompanying drawings, in which:

FIG. 5 is a vertical cross section through the frame, showing the assembly of the detasseling mechanism in elevation;

FIG. 6 is a cross section therethrough on the line 6—6 in FIG. 5;

FIG. 7 is a vertical cross section on the line 7—7 in FIG. 5;

FIG. 8 is a horizontal section, showing the feed and cutter means taken on the line 8—8 in FIG. 5; and FIG. 9 is a detail plan view of one of the feed belts.

DETAILED DESCRIPTION OF THE DRAWINGS

Figures 1, 2, 3, 4:
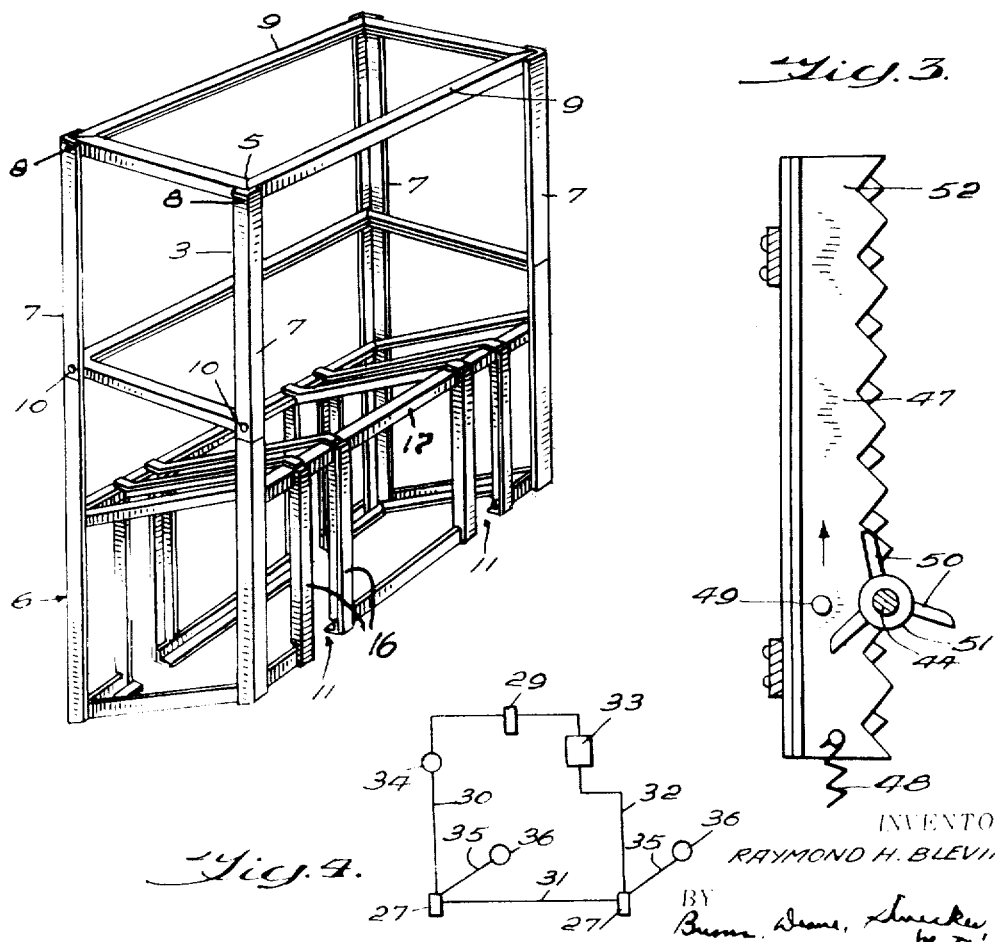
FIG. 1 is a side elevation of a helicopter to which the invention is applied.
FIG. 2 is a perspective view of the supporting frame structure of the device.
FIG. 3 is a detail cross section, showing the cutter, taken on the line 3—3 in FIG. 5.
FIG. 4 is a diagrammatic view illustrating the hydraulic circuit.

The invention is illustrated in connection with an aerial vehicle, such as a helicopter, which may be utilized in the detasseling method. The helicopter is indicated generally by the numeral 1, having a cabin 2, a step frame 3 and landing gear 4, all of which are of conventional construction well known in the art. The rotor blade for supporting the body of the helicopter is illustrated at 5 and is operated by an engine, usually located in a convenient position with respect to the body 2.

Helicopters have been used in agricultural work, particularly for spraying insecticides, fungicides and herbicides over standing fields of grain and other plants. Such vehicles can be operated at relatively slow speed along the tops of the plants as, for example, within one to three feet above the tops of corn. They are capable of taking off and landing and of moving along rows of grain standing in the field at relatively low speeds. Such helicopters are available as support vehicles for use in connection with this invention.

The mechanism for removing the tassels from standing grain is mounted on a supporting frame, generally indicated at 6. A suitable rectangular frame may be used for this purpose, formed of support bars securely anchored together in a rigid relation. The frame 6 will support the operating parts of the mechanism, as described. It is indicated in an operating position in FIG. 1 with respect to the running gear 4 of the vehicle.

The supporting means for the frame 6 includes parallel links 7 pivoted at 8 to a frame 9 that is rigidly secured to the step frame 3 of the vehicle beneath the cabin 2. The links 7 are in turn pivoted at 1 to the upper end of the frame 6 capable of swinging relative to the pivots 8 to raise and lower the frame 6 bodily from a position below the running gear 4 to a position above the latter as, for example, when the vehicle is landing. The links 7 may be in the form of flat bars or angle bars having ears at the ends thereof for connection with the pivots 8 and 10, but providing a freedom of swinging motion in at least one direction. The links 7 on each side of the frame will be maintained in parallel relation with each other as all of these links swing together so that the swinging motion will bodily lift the frame 6 from the position shown in FIG. 1 to an elevated position, as described.

The frame 6 is constructed with throats 11 therethrough, spaced apart approximately at the spacing of rows of grain, such as corn. Usually, the rows are spaced at a distance of from 3 to 38 inches. The throats 11, formed in the frame 6, will accommodate the appropriate spacing of the rows on which the device is to be used. This frame is intended to span two rows, but it will be understood that it may be made either for a single row or for multiple rows, as desired.

In each of the throats 11 is mounted a pair of rolls 12 operating in laterally abutting relation, as will be clear from FIGS. 6 and 7. These rolls 12 are preferably made of suitable yieldable material at the surfaces thereof, such as soft rubber, to receive portions of stalks therebetween. The forward ends of the rolls 12 are tapered, as indicated at 13, to provide an entrance throat for guiding the portions of the stalks between the rolls.

Each of the rolls 12 is mounted on a support shaft 14 journalled in suitable bearings 15 in an oblique position, as shown in FIG. 5, so that the entrance end of the pair of rolls is elevated somewhat with respect to the rear ends thereof. The bearings 15 may be mounted in any suitable manner within the frame 6 as, for example, on step supports 16 that are suspended from cross bars 17 in the frame. The frame 6 is cut away or open at the ends of the throats 11 so that the cross bars 17 are raised sufficiently to be out of the path of the stalks that move through the throats, and the bearings are at opposite sides of the throats.

The rolls 12 are both power driven and are turned in opposed directions with their contacting surfaces moving upward, thereby acting in an upward direction on the stalks received by the rolls. Any suitable drive means may be used for the purpose of accomplishing this operation. However, as illustrative thereof, I have shown a gear 18 fixed on each shaft 14 and meshing with a gear 19 on a shaft 20 extending upwardly therefrom in the frame 6. A similar drive shaft 2 is provided for each roll 12 and has a driving pinion 21 on the upper end thereof, as will be apparent from FIG. 7.

The pinions 21 mesh with pinions 22 on a cross shaft 23 on which is mounted a worm wheel 24 driven by a worm gear 25 on a shaft 26. The shaft 26 is driven, in turn, by a hydraulic motor 27, the construction and operation of which may be conventional and need not be described in detail.

The hydraulic motor 27 and the drive gearing connected therewith is shown as mounted in an elevated position in the frame 6. Any suitable mounting means may be used for the purpose such, for example, as a support bracket structure, generally indicated at 28.

In the presently illustrated structure, designed for two-row operation, there will be a hydraulic motor 27 for each pair of rolls 12 or two such motors mounted within the frame 6. While any suitable or desired hydraulic circuit may be used for supplying and controlling these motors 27, I have illustrated in FIG. 4 on such circuit that utilizes a hydraulic pump 29 connected through a line 3 to one of the motors 27 and from the latter by a line 31 to the other motor 27. The return is through a line 32 to a suitable tank or source of supply, generally indicated at 33.

Suitable control valves may be provided, as illustrated, for example, at 34 in FIG. 4. Additionally, the hydraulic motors usually include suitable control valves to regulate the speed thereof, whereby the two motors may be synchronized to operate at common speed. A pressure line may be provided for each of the motors 27, as illustrated at 35, leading to a suitable pressure gauge 36 within the cockpit of the cabin 12 for observation of the pilot as to the operation of the respective motors.

The hydraulic pump 29 may be supported in any suitable or convenient position on the vehicle as, for example, on the vehicle frame or on the frame 9, as illustrated in FIG. 5, which frame 9 may also carry the reserve pressure tank or reservoir 33. This pump 29 is driven by any suitable power means on the vehicle as, for example, by an electric motor or by an operative connection with the engine or transmission of the vehicle, a belt connection therewith being illustrated in FIG. 5 and designated at 37.

The mechanism described will operate the pair of drive shafts 20 in opposite directions so as to turn the rolls 12 toward each other, as illustrated by the arrows in FIG. 7. This will cause an upward pull on objects received between opposed contacting faces of the rolls which are gripped by the elastic surfaces thereof as these are in pressure relation to each other.

At the forward end of each of the rolls 12 is a depending stub shaft 38 having a pinion 39 meshing with the gear 18 so as to be operated in synchronism with the shaft 14. This stub shaft 38 is mounted in a suitable bearing supported on the frame 6 and extends downward to a point below the adjacent roll 12. The lower end of the stub shaft 38 carries a hub 39 on which radiating fingers 40 are mounted. These are preferably flexible fingers such as may be formed of soft rubber or other suitable material.

A pair of these sets of fingers 4 are located on opposite sides of the space between the rolls 12, as illustrated in FIGS. 7 and 8, thus acting in the directions shown by the arrows in FIG. 8 to move the standing stalks into the bite of the rolls 12, as the rolls are turned in the directions indicated by the arrows in FIG. 7. Guide forks 40' may be provided at the forward ends of the throats 11 to facilitate the introduction of the stalks to the region of the fingers 4 and of the rolls 12.

Also mounted on the stub shaft 38 are drive pulleys 41 over which belts 42 are trained and extend lengthwise beneath the respective rolls 12 to pulleys 43 on stub shafts 44 at the rear ends of the rolls. These stub shafts 44 are also power driven, preferably through bevel gears 45 from the shafts 14 of the rolls. The pulleys 41 and 43 effect longitudinal movement of the inner runs of the belts 42, as illustrated by the arrow in FIG. 8, thereby tending to feed the grain along the lengths of the rolls 12. The inner edges of the belts 42 may be provided with teeth, as illustrated at 42' in FIG. 9, to facilitate this movement of the stalks along the length of the rolls. The belts 42 may be guided intermediate the pulleys 41 and 43 by one or more idler pulleys 46 supported on stub shafts mounted in bearings in the frame 6.

In the event that any of the stalks should be bent over or if the tassel portions thereof are not removed by the pair of rolls 12, it is desired to assure that these portions will be removed effectively. I have provided, accordingly, a reciprocating cutter bar, generally indicated at 47, slidably mounted across the space between the rolls. This cutter bar 47 may be operated in any suitable manner from the power means on the frame. As herein shown, it is reciprocated in one direction by a coil spring 48 connected with an end of the cutter bar 47 and in the opposite direction by a pin 49 fixed to the cutter bar 47, as shown in FIGS. 3 and 8. The pin 49 is in position to be engaged by a series of fingers 50 mounted on a hub 51 on the shaft 44. Thus, the fingers 50 will be moved into engagement with the pin 49 upon operation of the pair of rolls 12, thereby effecting reciprocating movement of the cutter bar 47. Suitable guard means is shown at 52 coacting with the serrated edge of the cutter bar 47 to effect a cutting operation on the upper portions of the stalks that may reach the cutter without being separated.

The method of use of this mechanism and for effecting removal of the tassel portions of standing grain, such as corn for example, will be apparent from the foregoing description. The operation of the helicopter 1 will be similar to that heretofore used in agricultural service, it being maneuverable along the rows of grain at points at or close to the tops of the stalks and in relation thereto such that the tassel portions of the desired rows will be brought into juxtaposition with respect to the rolls 12. For this purpose, the frame 6 is suspended so as to locate the rolls 12 below the landing gear 4 of the helicopter, as illustrated in FIG. 1.

As the helicopter is so guided along the row of grain, the top portions will enter the throats 11 in the frame 6 and between the respective pairs of rolls 12, being directed thereto by the tapered forward ends of the rolls and by the rotating opposed fingers 40. The rotary motion of the rolls will cause these to engage the upper portions of the stalks and effect an upward pull thereon sufficient to extract or remove the tassel portions at or about the first or second joint.

The inclined portions of the rolls 12 lengthwise of the rows of grain will facilitate the grasping of the tassel portions without requiring precise positioning of the rolls with respect thereto. The movement of the stalks along the length of the rolls 12 will be facilitated by the belts or conveyors 42. If any of the stalks should reach the back end portions of the rolls or be deflected beneath the latter, the top portions of these would be severed by the cutter 47.

Thus, substantially complete and effective removal of the tassel portions of the rows of female stalks may be effected in this manner as the helicopter moves over the field of standing grain. This is accomplished without disturbing the growing of the grain and without damage thereto. It is much more expeditious, with little labor, than could be accomplished by hand or by power equipment movable through the field.

If it is desired, however, the frame 6 and its operating mechanism may be mounted on a highboy frame self-propelled through the field for effecting the removal of the tassels from standing grain.

After the operation is completed, the frame 6 and its mechanism may be moved to an elevated position above the landing gear 4 of the vehicle as, for example, by swinging the parallel links 7 in an upward direction. Suitable power means may be connected with the links for effecting such retraction of the frame as, for example, by means of cables, generally indicated at 52 in FIG. 1 and leading to the platform 3. A suitable hydraulic cylinder may be connected with the links, if desired, for effecting movement thereof.

This method of removing the tassel portions of stalks of grain standing in the field saves materially in hand labor and assures effective removal of the desired portions thereof very expeditiously. The means employed to effect the operation is simple and inexpensive to construct, consistent with the purpose and use thereof.

While the invention has been illustrated and described in one embodiment, it is recognized that variations and changes may be made therein without departing from the invention.

I claim:

1. A method of removing the tassels from the stalks of corn planted in rows in a field, comprising moving an aerial vehicle along and above the rows of standing corn at a relatively slow speed, reaching down from the vehicle into grasping engagement with the tassel end portions of the stalks of standing grain, and continuously and sequentially pulling upward on successive ones of said tassel end portions to continuously separate said tassels from the major portions of the stalks.

2. A method of removing the tassels from the stalks of corn standing in a field, according to claim 1, wherein the tassel end portions are separated from the stalks approximately at the first joint.

3. A method of removing the tassels from the stalks of corn standing in a field, according to claim 1, wherein the pulling action is applied by a rolling motion upwardly lengthwise of the stalks.

4. In a detasseler for hybrid seed corn planted in rows in a field, the combination with an aerial vehicle having means for propelling said vehicle over said field, of a supporting frame carried by the aerial vehicle, and means on the supporting frame for removing the tassels continuously and sequentially from standing grain in a field while the aerial vehicle moves over the field along and above the rows of grain.

5. In a hybrid seed corn detasseler according to claim 4, wherein the aerial vehicle has landing supports, and means for moving the tassel removing means to a position above the landing supports.

6. In a hybrid seed corn detasseler according to claim 4, including parallel motion linkage supporting the frame from the aerial vehicle for swinging movement to raise and lower the tassel removing means relative to the aerial vehicle.

7. In a hybrid seed corn detasseler according to claim 4, wherein the aerial vehicle includes ground engaging means for supporting the vehicle, and means for raising the tassel removing means to a retracted position above the ground engaging means.

8. In a detasseler for hybrid seed corn planted in rows in a field, the combination with an aerial vehicle having running gear for supporting the vehicle on the ground, of means for removing the tassels from standing grain in a field while the aerial vehicle moves over the field along the rows of grain, a supporting frame for the tassel removing means, and parallel link means pivotally supported on the aerial vehicle and pivotally connected with the supporting frame and holding the tassel removing means in an operative position below the running gear, said parallel link means being movable relative to the vehicle to raise the tassel removing means above the running gear for landing of the vehicle.

9. In a hybrid seed corn detasseler as defined in claim 8, a supporting frame, a pair of rolls mounted on the frame and having opposed abutting surfaces of yieldable material, power means on the frame for turning the rolls with the opposed surfaces moving in an upward direction to remove tassel portions of stalks therebetween, and power driven means for feeding the tassel portions of the stalks between the rolls.

10. A hybrid seed corn detasseler according to claim 9, wherein the feeding means includes a rotary hub having radiating fingers thereon movable in a direction lengthwise of the rolls.

11. A hybrid seed corn detasseler according to claim 9, including conveyor means extending lengthwise of the rolls for moving the tassel portions of the stalks lengthwise thereof between the rolls.

12. A hybrid seed corn detasseler according to claim 9, including power driven means mounted on the frame for severing the stalks after passage through the rolls.

13. A hybrid seed corn detasseler according to claim 9, wherein the rolls are mounted in oblique positions with tapered forward ends elevated to receive the tassel portions and draw the same therebetween.

14. A hybrid seed corn detasseler as defined in claim 8, a supporting frame, a pair of rolls mounted in oblique positions on the frame with tapered forward ends elevated to receive tassel portions of stalks therebetween, power means on the frame for turning the rolls in opposed upward directions to pull upward and separate the tassel portions of the stalks, and means operating lengthwise of the rolls for feeding the stalks therealong.

15. A hybrid seed corn detasseler according to claim 14, including feeding means at the forward ends of the rolls for moving the stalks between the rolls, and means at the rearward ends of the rolls for severing the tassel portions from the stalks.

* * * * *